United States Patent
Oishi

(10) Patent No.: US 7,286,323 B2
(45) Date of Patent: Oct. 23, 2007

(54) DISK CARTRIDGE INCLUDING MULTIPLE FLEXIBLE DISKS, PLURAL PARTITIONING PLATES, AND A SHUTTER

(75) Inventor: Kengo Oishi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 132 days.

(21) Appl. No.: 11/217,310

(22) Filed: Sep. 2, 2005

(65) Prior Publication Data

US 2006/0080696 A1    Apr. 13, 2006

(30) Foreign Application Priority Data

Sep. 27, 2004    (JP) .............................. 2004-279776

(51) Int. Cl.
*G11B 17/038* (2006.01)
(52) U.S. Cl. ..................................... 360/133
(58) Field of Classification Search ................ 360/133, 360/98.01
See application file for complete search history.

(56) References Cited

U.S. PATENT DOCUMENTS 4,604,664 A * 8/1986 Barski ...................... 360/99.12
6,131,129 A * 10/2000 Ludtke et al. .................. 710/5
6,441,997 B1 * 8/2002 Blum .......................... 360/133
2003/0206367 A1 * 11/2003 Huang et al. ............. 360/97.01
2003/0231427 A1 * 12/2003 Nakamikawa ............... 360/133
2006/0044685 A1 * 3/2006 Oishi ......................... 360/133

FOREIGN PATENT DOCUMENTS

JP        2004-022011 A        1/2004

* cited by examiner

*Primary Examiner*—Jefferson Evans
(74) *Attorney, Agent, or Firm*—Sughrue Mion, PLLC

(57) ABSTRACT

A recording disk cartridge is provided which includes a plurality of flexible recording disk media stacked inside a cartridge case so as to rotate integrally. The cartridge case includes a lower plate for constructing a lower wall parallel to the plurality of recording disk media, a plurality of inner plates which are stacked and fixed on the lower plate and partition the plurality of recording disk media, and an upper plate which is stacked and fixed on the plurality of inner plates and constructs an upper wall of the cartridge case. An opening is formed in a part of a side wall constructed of the lower plate, the plurality of inner plates, and the upper plate. The recording disk cartridge further includes a lower rotor and an upper rotor supported on inner sides of the lower plate and the upper plate respectively so as to rotate, and a shutter plate having a height corresponding to a height of the stacked recording disk media. The shutter plate is engaged with the upper rotor and the lower rotor so as to open and close the opening.

21 Claims, 9 Drawing Sheets

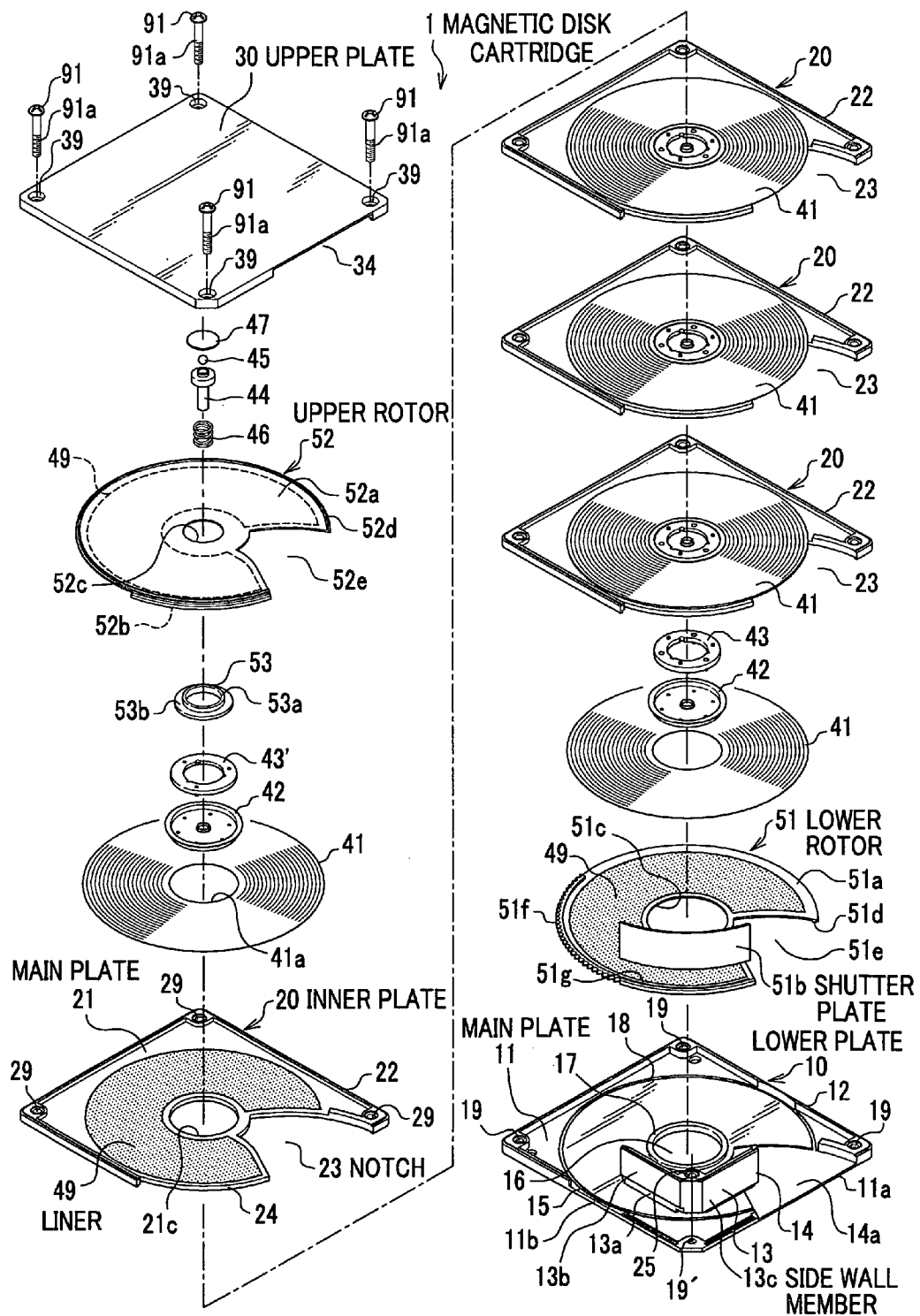

FIG.3
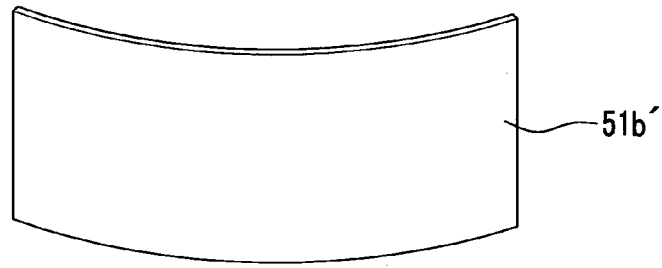
FIG.4
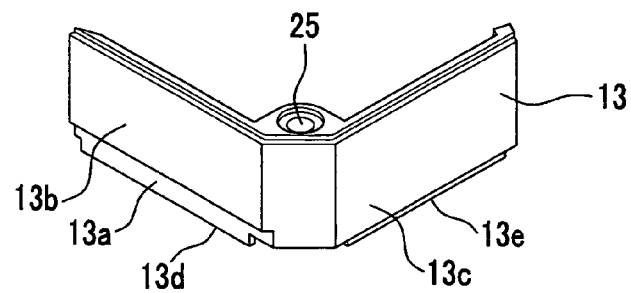
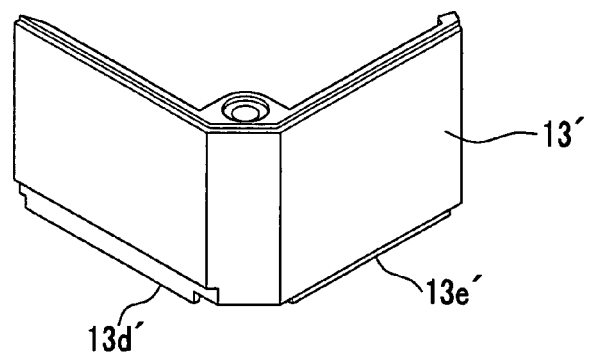

DISK CARTRIDGE INCLUDING MULTIPLE FLEXIBLE DISKS, PLURAL PARTITIONING PLATES, AND A SHUTTER

CROSS REFERENCE TO RELATED APPLICATIONS

This application claims the foreign priority benefit under Title 35, United States Code, §119(a)-(d), of Japanese Patent Application No. 2004-279776, filed on Sep. 27, 2004 in the Japan Patent Office, the disclosure of which is herein incorporated by reference in its entirety.

BACKGROUND OF THE INVENTION

1. Field of the Invention

The present invention relates to a recording disk cartridge comprising a plurality of flexible recording disk media.

2. Description of the Related Art

Conventionally, as a recording disk medium a flexible recording disk medium is known where a magnetic layer is formed on both faces of a disc-form support body consisting of a flexible material such as a polyester sheet. Although the magnetic disk medium has a merit of speedily accessing data in comparison with a magnetic tape, on the other hand, it has a demerit of a memory capacity being small because a recording area thereof is small.

In order to solve the demerit of the flexible magnetic disk medium, it is conventionally disclosed a magnetic disk cartridge for housing a plurality of magnetic disk media in one cartridge case (for example, see JP 2004-22011A).

In this connection, because a flexible magnetic disk medium is low in rigidity thereof, there is a problem that the medium tends to vibrate in a vertical direction for a recording face when rotated. Therefore, in an invention of JP 2004-22011A each magnetic disk medium is made a configuration of being pinched by shutters. Thus by arranging plate members of high rigidity such as the shutters in a vicinity of the magnetic disk medium, the recording face can be stabilized because the medium becomes along the plate members, accompanied with a rotation of the medium.

However, a magnetic disk cartridge disclosed in JP 2004-22011A (paragraphs 0011-0030 and FIG. 3) has a problem of high cost for a housing since the housing which consists of a first shell half and a second shell half has to be replaced by another housing whose thickness corresponds to a height varying with the number of magnetic disk media, every time when the number of magnetic disk media contained in a cartridge case needs to be changed.

From such a background, what has been strongly requested is a recording disk cartridge of the present invention. An object of the present invention is to provide a recording disk cartridge in which the number of recording disk media can be changed with minimum change of parts.

SUMMARY OF THE INVENTION

According to the present invention, it is possible to provide a cartridge case corresponding to a height of stacked recording disk media by replacing only a shutter plate substantially. Moreover, it is also possible to provide a cartridge case corresponding to a height of stacked recording disk media with minimum change of parts.

In one aspect of the present invention, there is provided a recording disk cartridge including a plurality of flexible recording disk media. The plurality of flexible recording disk media are stacked inside a cartridge case so as to rotate integrally. The cartridge case includes a lower plate for constructing a lower wall parallel to the plurality of recording disk media, a plurality of inner plates which are stacked and fixed on the lower plate and partition the plurality of recording disk media, and an upper plate which is stacked and fixed on the plurality of inner plates and constructs an upper wall of the cartridge case. An opening is formed in a part of a side wall constructed of the lower plate, the plurality of inner plates, and the upper plate. The recording disk cartridge further includes a lower rotor supported on an inner side of the lower plate so as to rotate, an upper rotor supported on an inner side of the upper plate so as to rotate, and a shutter plate having a height corresponding to a height of the stacked recording disk media. The shutter plate is engaged with the upper rotor and the lower rotor so as to open and close the opening.

The recording disk cartridge according to the present invention may further include at least one side wall member having a height corresponding to a height of the stacked inner plates. A lower end and an upper end of the at least one side wall member may be fit in predetermined regions of peripheral rims of the lower plate and the upper plate respectively.

A notch for exposing a recording face of each of the recording disk media may be formed in each of the plurality of inner plates. The opening formed with the lower plate, the plurality of inner plates, and the upper plate stacked together in a predetermined sequence may be in a position corresponding to a position where the notch is formed.

The side wall member may be detachably attached to the upper plate and the lower plate so as to be replaced with another side wall member with a height corresponding to a height varying with the number of stacked inner plates.

In the recording disk cartridge, a plurality of side wall members with various heights may be prepared in advance to make it possible to construct a cartridge case corresponding to a height of stacked recording disk media by replacing only the side wall member. Moreover, it is possible to construct a cartridge case corresponding to a height of stacked recording disk media with minimum change of parts.

The shutter plate may be detachably attached to the upper plate and the lower plate so as to be replaced with another shutter plate with a height corresponding to a height varying with the number of stacked inner plates.

In the recording disk cartridge of the invention, the shutter plate can be attached to the upper rotor and the lower rotor so as to engage with them. Therefore, a plurality of shutter plates with various heights may be prepared in advance so that the shutter plate can be replaced with another one having a different height to construct a cartridge case corresponding to a height of stacked recording disk media, to change the number of the inner plates.

A shutter groove may be formed in each of peripheral rims of the upper rotor and the lower rotor. An upper end and a lower end of the shutter plate may be respectively engaged with the shutter grooves in the peripheral rims of the upper rotor and the lower rotor, allowing the upper rotor and the lower rotor to rotate integrally inside the cartridge case.

A support groove may be provided on an inner face of the upper plate. The support groove may be fit to a rib provided on the peripheral rim of the upper rotor and support the upper rotor, allowing the upper rotor to rotate.

A gear may be provided on the peripheral rim of the lower rotor.

A groove for guiding a shutter open gear which is engaged with the gear to allow the shutter plate to open and close the opening may be provided on the peripheral rim of the lower plate.

A rib extending in a vertical direction for a stack face of the plurality of inner plates may be formed at a peripheral rim of each of the plurality of inner plates. In addition, a lower plate rib for abutting with the rib of a lowermost inner plate may be provided on the lower plate. Moreover, an upper plate rib for abutting with a rib of an uppermost inner plate may be provided on the upper plate.

A part of a side wall of the recording disk cartridge formed with the lower plate, the plurality of inner plates, and the upper plate stacked together in a predetermined sequence may be constructed of the ribs, the lower plate rib, and the upper plate rib.

The recording disk media may be stacked by engaging center cores of the recording disk media with spacers each disposed between adjacent center cores. Each of the spacers may stop relative rotation between the adjacent center cores so as to allow the stacked recording disk media to integrally rotate.

A liner may be provided on each of an upper face of the lower rotor, upper faces and lower faces of the plurality of inner plates, and a lower face of the upper rotor.

The recording disk medium may be a magnetic disk medium.

Also, the recording disk medium may be an optical disk medium.

BRIEF DESCRIPTION OF THE DRAWINGS

FIG. 1 is an exploded perspective view of a magnetic disk cartridge related to an embodiment of the present invention.

FIG. 3 is a perspective view showing two shutter plates whose heights are different each other.

FIG. 4 is a perspective view showing two side wall members whose heights are different each other.

DESCRIPTION OF THE PREFERRED EMBODIMENTS

Figure 2A:
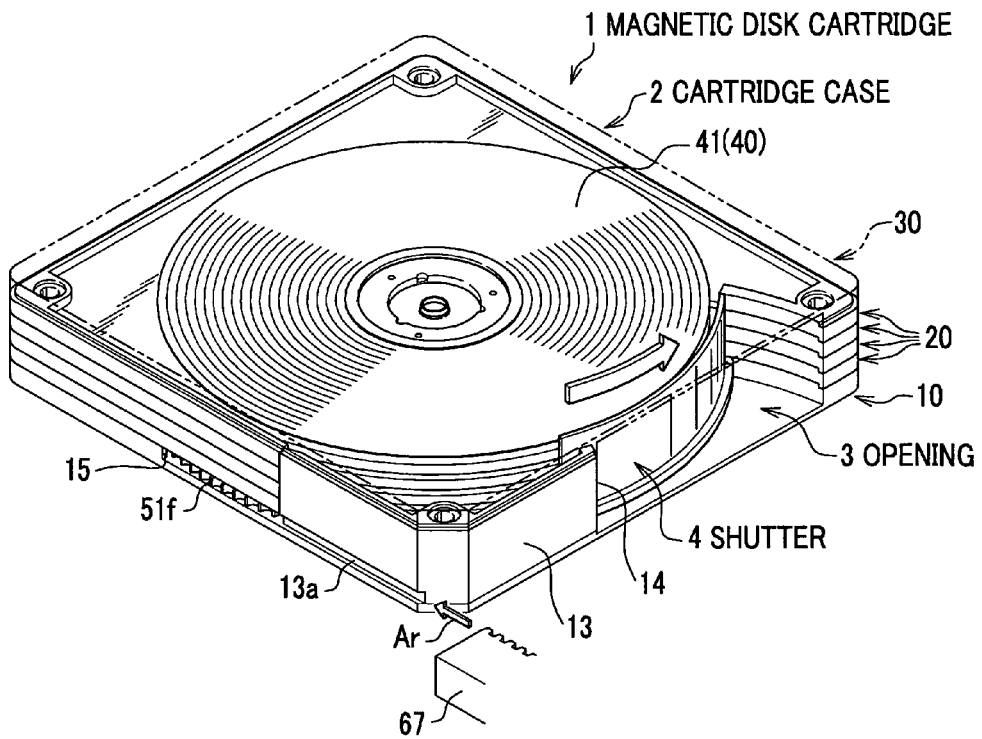
FIG. 2A is an external perspective view of a magnetic disk cartridge with a shutter closed related to an embodiment of the present invention.

Here will be described an embodiment of the present invention in detail, referring to drawings as needed. In the embodiment will be described a case of adopting a magnetic disk medium as an example of a recording disk medium.

Meanwhile, in a description below, with respect to up/down directions, making it a standard a typical use state of the magnetic disk cartridge, vertical directions for faces of magnetic disk media are called the up/down directions for convenience.

As shown in FIG. 1, in a magnetic disk cartridge 1 of an example of a recording disk cartridge are stacked a lower plate 10 for configuring a lower wall thereof a plurality of, for example, four inner plates 20, and an upper plate 30 for configuring an upper wall thereof in this order; these are fastened and fixed with four screws 91; and thereby a cartridge case 2 (see FIG. 2A) is configured. Between the lower plate 10 and the lowermost inner plate 20, between any adjacent two of the four inner plates 20, and between the uppermost inner plate 20 and the upper plate 30 is arranged a magnetic disk medium 41, respectively. Each magnetic disk medium 41 is a disc form having an opening 41a at center thereof, and a center core 42 made of metal is affixed at rim of the opening 41a. It is designed that any adjacent two center cores 42 are engaged by spacers 43A, 43, and 43', and that five magnetic disk media 41 (the magnetic disk media 41 stacked and integrated are assumed to be a disk stack 40) are integrally rotated.

In each of the inner plates 20 is formed a rib 22 for abutting with upper/lower plates at a peripheral rim of a flat main plate 21. Part of a right near side of each of the inner plates 20 in FIG. 1 forms a notch 23 so that magnetic heads 63 (see FIG. 2) can easily move onto the magnetic disk media 41. At the portion of the notch 23 is not formed the rib 22, and therefore, when the inner plates 20 are stacked up, an opening 3 is formed on a side face of the cartridge case 2 as shown in FIG. 2A.

The opening 3 is opened/closed by a shutter 4 that coaxially rotates with the disk stack 40. As shown in FIG. 1, the shutter 4 is configured by combining a lower rotor 51 and an upper rotor 52.

Next will be described each member in more detail.

Figure 6:
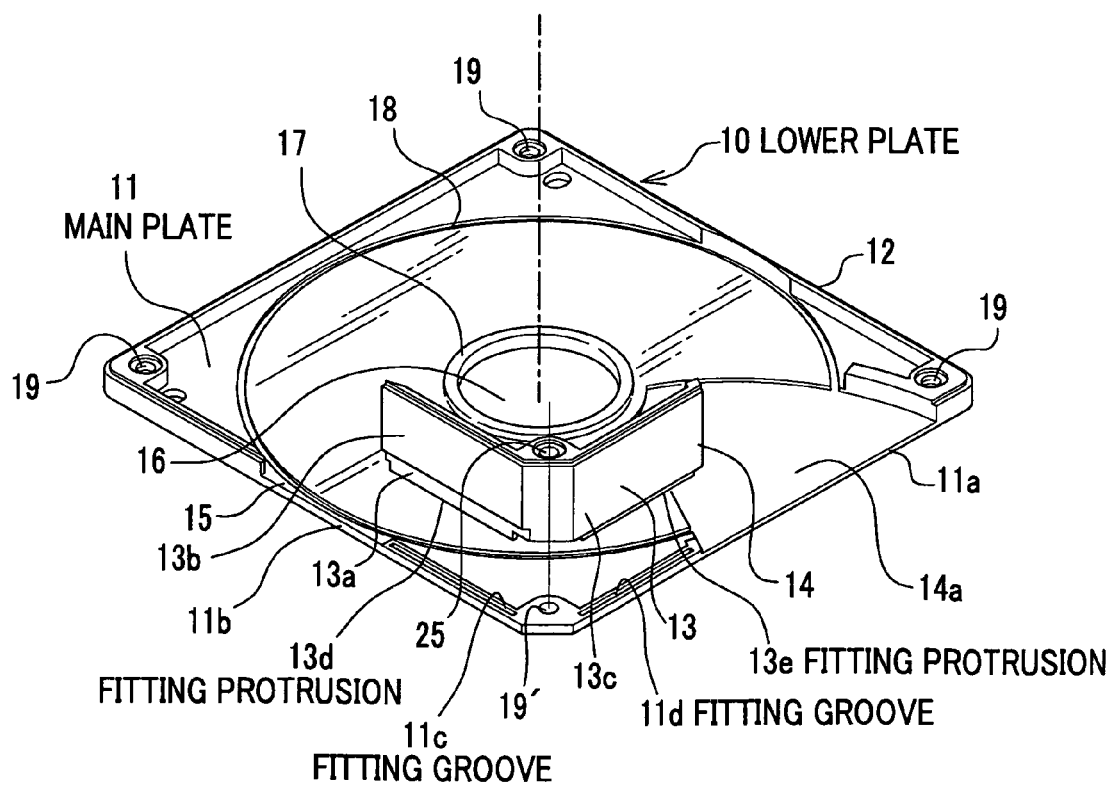
FIG. 6 is an exploded perspective view showing a lower plate and a side wall member.

The lower plate 10 is designed that a rib 12 for abutting with a lower face of the rib 22 of the lowermost inner plate 20 is formed mainly on a peripheral rim of a main plate 11 in a substantially square shape. In addition, fitting grooves 11c and 11d, which are two long grooves on the left and right sides, are formed on the near side in the main plate 11 in FIG. 1 and FIG. 6.

Here, a side wall member 13, which is a plate member bent in an L-shape, has a first flat plate portion 13b and a second flat plate portion 13c extending from one of rims of the first flat plate portion 13b. Moreover, fitting protrusions 13d and 13e, which are rectangle plates extending from corresponding lower rims of the flat pate portions 13b and 13c, are formed along the lower rims of the flat pate portions 13b and 13c respectively. The fitting protrusions 13d and 13e of the side wall member 13 are respectively engaged (fit) in the fitting grooves 11c and 11d of the main plate 11, and thus the side wall member 13 is attached to the main plate 11. Meanwhile, the side wall member 13 is attached vertically in a predetermined range that is, enough range to stow the shutter plate 51b (about one third of a side of the main plate 11), from a corner of the main plate 11 (a corner on the near side in FIG. 1 and FIG. 6) and formed with an approximate height of the stacked inner plates 20. In other words, the shutter plate 51b is completely covered behind the side wall member 13 while the opening 3 is open. A screw hole 25 which penetrates vertically is formed in a corner portion between the first flat plate portion 13b and the second flat plate portion 13c of the side wall member 13.

A sector portion toward a center of the main plate 11 from one edge 11a (one edge of right near side in FIG. 1) continuing into the side wall member 13 of the main plate 11 is designed to form a depression 14a lowered by one step, not to form the rib 12 at the peripheral rim of the main plate 11, and to become an opening 14 (See FIG. 2A). Thus it becomes easy for the magnetic heads 63 to proceed into the cartridge case 2.

An approximately central one third range of the other edge 11b (one edge of left near side in FIG. 1) continuing into the side wall member 13 of the main plate 11 is designed not to form the rib 12 but to become an opening 15 (See FIG. 2A) so that a gear 51f of the lower rotor 51 described later can be exposed. In addition, outside the side wall member 13 of the other edge 11b is formed a groove 13a along a periphery of the lower plate 10, continuing into the opening 15. The groove 13a is designed to be a passage where a shutter open gear 67 (see FIGS. 2A and 2B) of a magnetic disk drive proceeds in a direction shown in an arrow Ar of FIG. 2A and enters in the opening 15 in order to engage in the gear 51f.

The rib 12 is formed so as to protrude upward across all periphery except the side wall member 13 and the openings 14 and 15 out of a peripheral rim of the main plate 11.

At center of the main plate 11 is formed a circular opening 16 for exposing the center core 42 provided inside the lowermost magnetic disk medium 41. At upper rim of the opening 16, across all periphery thereof is formed a rib 17 outside which a central opening 51c formed at center of the lower rotor 51 fits. The rib 17 rotationally freely supports the lower rotor 51.

In addition, on an upper face (inner face) of the main plate 11 is formed a circular lower rotor support groove 18 at a position corresponding to peripheral rim of the lower rotor 51. The lower rotor support groove 18 rotationally freely supports the lower rotor 51 coaxially with the magnetic disk media 41 by engaging in a rib 51d (see FIG. 9) formed downward at a peripheral rim of the lower rotor 51.

In addition, a screw hole 19 with female thread which penetrates vertically is formed at each of three corners of the main plate 11 except a corner where the side wall member 13 is attached. Moreover, a screw hole 19' with female thread is formed at the corner of the main plate 11 where the side wall member 13 is provided.

The main plate 21 of each of the inner plates 20 is substantially a square, and a portion corresponding to one of four corners of the square is designed to be an arc (arc portion 24) one size larger than the magnetic disk medium 41. At one edge (right near side in FIG. 1) continuing into the arc portion 24 is formed the notch 23 into a sector. The rib 22 protrudes the up/down directions and is formed across all periphery except the arc portion 24 and the notch 23 out of periphery rim of the main plate 21. At center of the main plate 21 is formed a central opening 21c for enabling the upper center core 42 to be exposed and to be coupled with the lower center core 42.

In addition, at three corners of the main plate 21, with penetrating through the three corners in the up/down directions, are formed holes 29 through which screw shaft portions 91a of the screws 91 are inserted, respectively.

Figure 8:
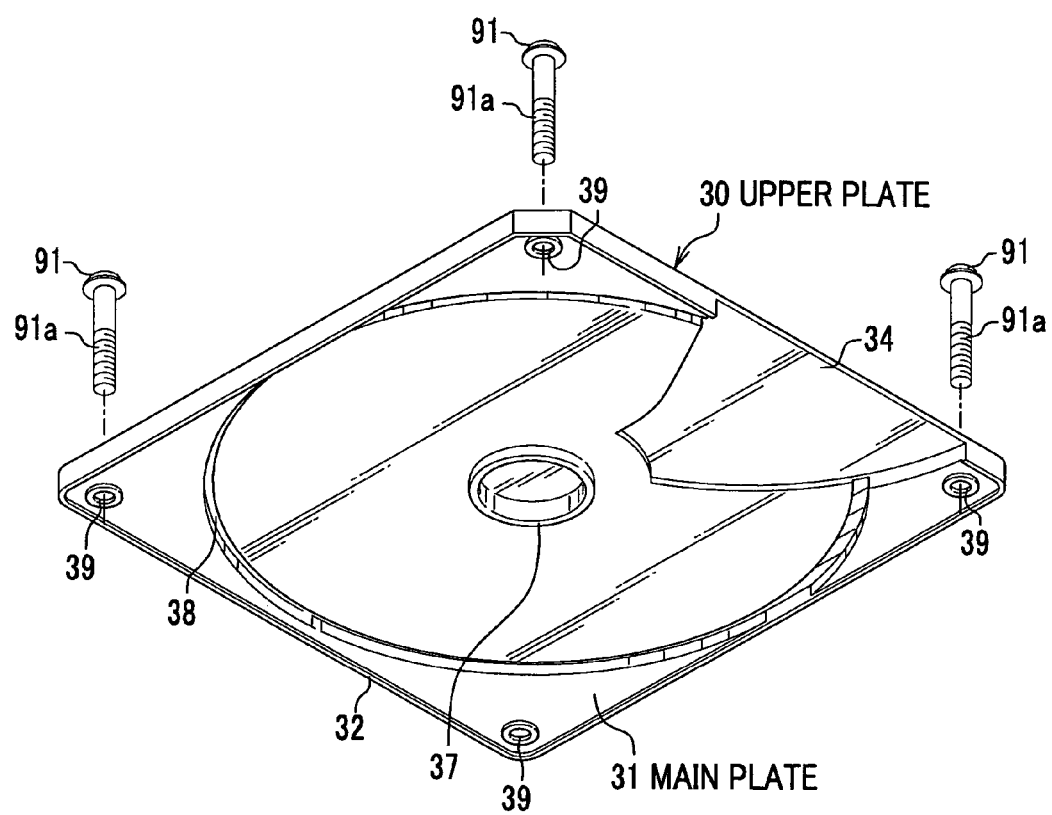
FIG. 8 is a perspective view showing an inner face of an upper plate.

The upper plate 30 is formed substantially symmetric to the lower plate 10. As shown in FIG. 8, in the upper plate 30, on a substantially square main plate 31 are formed a depression 34 corresponding to the depression 14a, a rib 37 corresponding to the rib 17, and an upper rotor support groove 38 corresponding to the lower rotor support groove 18. Meanwhile, no opening is formed at a center of the main plate 31.

In addition, at a peripheral rim of the main plate 31, across all periphery except the depression 34 is formed a rib 32 protruding downward.

In addition, at four corners of the main plate 31 are respectively formed holes 39 that enables the screw shaft portions 91a of the screws 91 to be penetrated therethrough.

The lower rotor 51 is designed such that a central opening 51c, a notch 51e, a rib 51d, and the gear 51f are formed on a lower rotor plate 51a which is in the substantially same ring-form as the magnetic disk medium 41. The central opening 51c is formed as a circle fitting outside the rib 17, and the notch 51c is formed as a sector corresponding to the depression 14a. In addition, the rib 51d is provided downward at a peripheral rim of a lower face of the lower rotor plate 51a, corresponding to the lower rotor support groove 18. Moreover, a lower shutter groove 51g is formed in an arc form between the gear 51f and the notch 51c on the peripheral rim of the lower rotor plate 51a.

The shutter plate 51b is a blocking member to open and close the opening 3 (see FIG. 2A) and is formed with a height corresponding to the height of the stacked magnetic disk media 41. The shutter plate 51b shields the disk stack 40 when the opening 3 is closed. The gear 51f is an engaged portion for opening/closing the shutter 4 (see FIG. 2A) from outside of the magnetic disk cartridge 1, and is formed at a peripheral rim of the lower rotor plate 51a within a predetermined range with neighboring the shutter plate 51b.

The upper rotor 52 is designed to be substantially symmetric to the lower rotor 51: the upper rotor 52 comprises an upper rotor plate 52a similar to the lower rotor plate 51a; on the upper rotor plate 52a are formed a central opening 52c fitting outside the rib 37 of the upper plate 30, a notch 52e corresponding to the depression 34, and a rib 52d corresponding to the upper rotor support groove 38. In addition, an upper shutter groove 52b is formed in a portion adjacent to the notch 52e on a peripheral rim of the upper rotor plate 52a, corresponding to the shutter plate 51b of the lower rotor 51. The upper shutter groove 52b and the lower shutter groove 51g are respectively engaged with an upper end rim and a lower end rim of the shutter plate 51b so as to allow the lower rotor 51 and the upper rotor 52 to rotate integrally.

The upper rotor 52 is rotationally freely supported by the upper plate 30 by the central opening 52c fitting outside the rib 37 of the upper plate 30, and the rib 52d engaging in the upper rotor support groove 38. Meanwhile, the upper rotor 52 is prevented from dropping from the upper plate 30 by a stop member 53. The stop member 53 comprises a cylindrical portion 53a inserted in the rib 37 (see FIG. 8) and a flange 53b formed at one end of the cylindrical portion 53a; the cylindrical portion 53a is inserted in the central opening 52c from a lower side of the upper rotor 52 and is fixed at the rib 37 by ultrasonic welding, adhesion, and the like.

Figure 10:
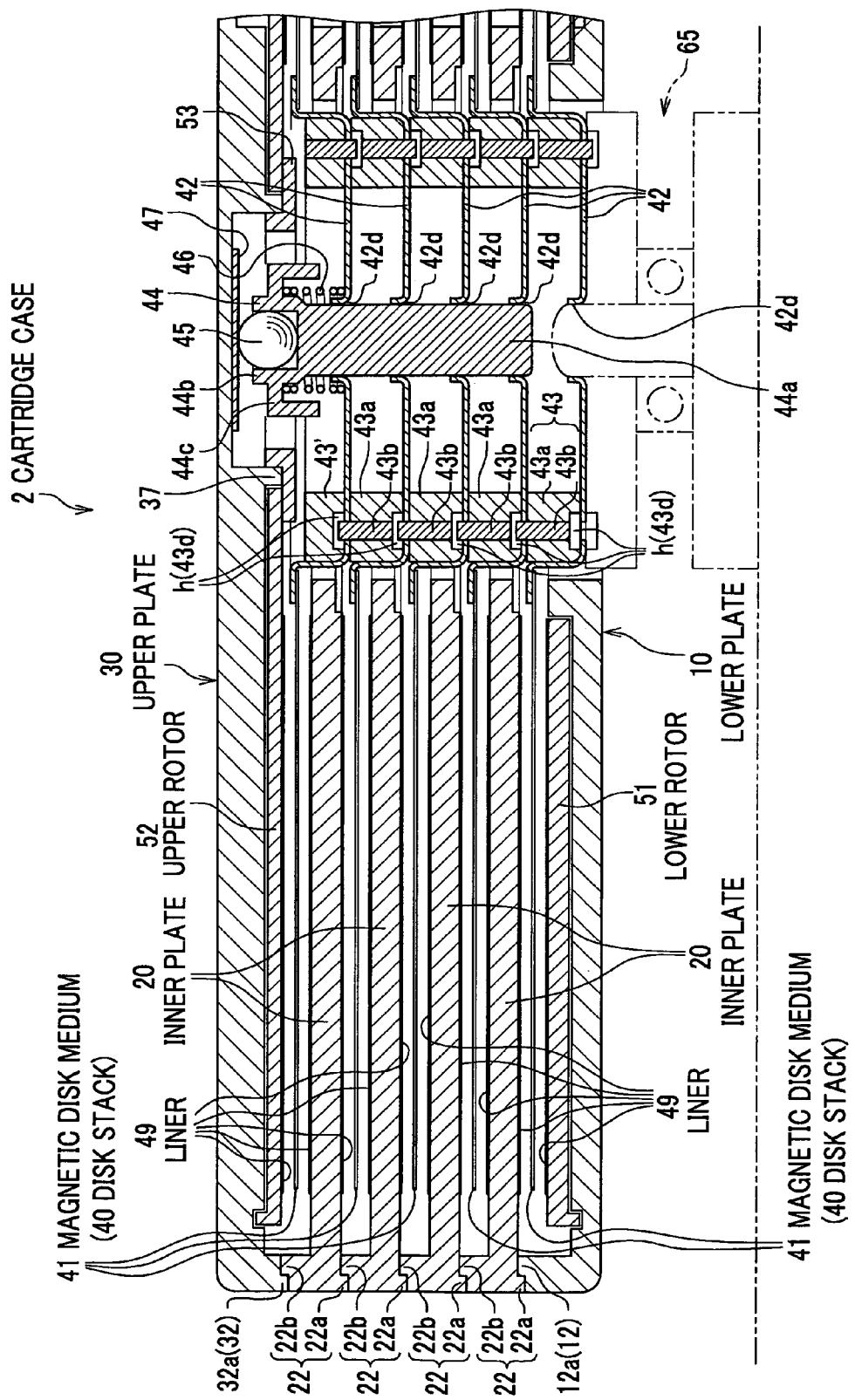
FIG. 10 is a partially enlarged drawing of FIG. 9.

As an enlarged section drawing shown in FIG. 10, an upper face of the lower rotor 51, upper and lower faces of the inner plates 20, and a lower face of the upper rotor 52 are faces opposing the magnetic disk media 41, where liners 49 are affixed across portions opposing the media 41, respectively.

The liners 49 consist of, for example, a non-woven cloth such as a polyester fiber and a blended fabric fiber of rayon and polyester Next will be described a stack structure of the lower plate 10, the inner plates 20, and the upper plate 30.

In the rib 12 of the lower plate 10, as shown in FIG. 10, an inside thereof is formed higher by one step than an outside thereof, and thereby a male type step portion 12*a* is formed; each rib 22 of the inner plates 20 forms a female type step portion 22*a* protruding downward at outermost periphery, and thus a periphery of the male type step portion 12*a* and an inner perimeter of the female type step portion 22*a* become able to be fitted. In addition, when the lower plate 10, the inner plates 20, and the upper plate 30 are fastened by the screws 91 (see FIG. 1), an upper face of the male type step portion 12*a* and a corresponding portion of a lower face of the lowermost inner plate 20 are designed to be contacted. Thus, because the rib 12 of the lower plate 10 and the rib 22 of the inner plate 20 are sealingly abutted and fitted each other, an invasion of dust into the cartridge case 2 from outside is prevented.

Similarly, any adjacent two of the inner plates 20, and the uppermost inner plate 20 and the upper plate 30 are stacked by being sealingly abutted and fitted each other. In other words, on an upper face of each of the inner plates 20 is formed a male type step portion 22*b* where an inside of the upper face is formed higher by one step; at a rib 32 of the upper plate 30 is formed a female type step portion 32*a* of which outermost periphery protrudes downward by one step. And the male type step portion 22*b* of one inner plate 20 and the female type step portion 22*a* of an upper adjacent inner plate 20 are sealingly abutted and fitted each other; the male type step portion 22*b* of the uppermost inner plate 20 and the female type step portion 32*a* of the upper plate 30 are sealingly abutted and fitted, and stacked. Thus any adjacent two of the ribs 12, 22, 32 are sealingly abutted and fitted each other, and dust from outside is prevented from invading into the cartridge case 2. In addition, as soon as the lower plate 10, the inner plates 20, and the upper plate 30 are stacked, the side wall member of the cartridge case 2 is configured.

In addition, both of the female type step portion 22*a* and the male type step portion 22*b* protrude from the main plate 21 beyond a thickness of the liner 49. Therefore, after affixing the liners 49 on the inner plates 20 and making an assembly, then even if placing it on a work bench, the liners 49 do not contact the work bench, and accordingly, are not contaminated with dust and the like.

Such the configuration of the cartridge case 2 by stacking the inner plates 20 facilitates a change of the number of the magnetic disk media 41; although a height change of the side wall member 13 and that of the shutter plate 51*b* are requested, the number of housing units of the magnetic disk media 41 formed within the cartridge case 2 can be changed only by mainly changing the number of the inner plates 20.

Next will be described the magnetic disk media 41 and a stack structure thereof. The magnetic disk media 41 are ones where magnetic paint is coated on both faces of a resin sheet, for example, such as polyester.

Figure 11:
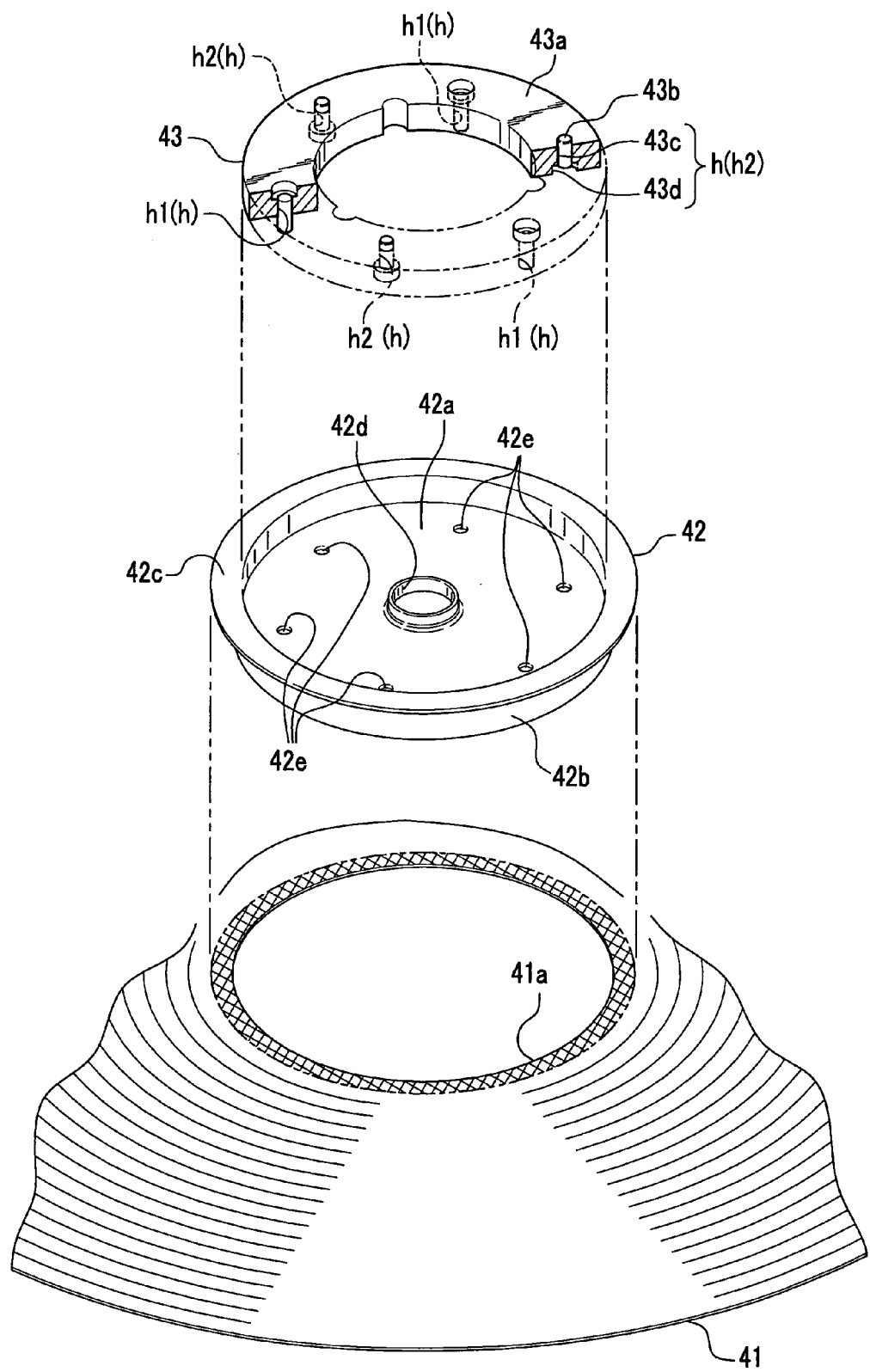
FIG. 11 is an exploded perspective view showing a stack structure of magnetic disk media.

As shown in FIG. 11, each of the center cores 42 is one substantially made a hat form with draw forming a metal plate by press: the center core 42 is mainly configured of a circular bottom plate 42*a*, a low cylindrical side wall member 42*b* rising from peripheral rim of the bottom plate 42*a*, and a flange 42*c* widening in an outer diameter direction from an upper end of the side wall member 42*b*. At center of the bottom plate 42*a* is formed a center hole 42*d*, and at rim of the plate 42*a* are formed six small holes 42*e* at a distance of 60 degrees, making the center hole 42*d* a center thereof.

A spacer 43 is provided between adjacent center cores 42, keeps a distance of each of the center cores 42, and stops a rotation between each of the center cores 42. The spacer 43 is mainly configured of a main body portion 43*a* shaped like a ring from a resin and metallic pins 43*b* pressed into the main body portion 43*a*. In the main body portion 43*a* are formed six penetration holes h at positions corresponding to the small holes 42*e* of the center core 42, wherein each of the penetration holes h consists of a small diameter hole portion 43*c*, where the pin 43*b* is pressed, and a large diameter hole portion 43*d* that is coaxial with and slightly larger in diameter than the small diameter hole portion 43*c*. The six penetration holes h are designed to be upside down in any two adjacent ones. In other words, penetration holes h2 of both adjacent penetration holes h1, where each the large diameter hole portion 43*d* is positioned at an upper side thereof, are arranged so that the large diameter hole portion 43*d* is positioned at a lower side thereof. To put another way, when a large diameter hole portion 43*d* of a penetration hole h1 is positioned at the upper side, the large diameter hole portions 43*d* of the both adjacent penetration holes h2 of the penetration hole h1 are positioned at the lower side.

Into each of the small diameter portions 43*c* is pressed each one pin 43*b* from upper/lower sides thereof, one end of the pin 43*b* is positioned at a boundary of the large diameter hole portion 43*d* and the small diameter hole portion 43*c*, and the other end thereof protrudes outside the small diameter portion 43*c*. The large diameter hole portion 43*d* serves a function of a clearance at ends of pins 43*b* of adjacent spacers 43.

Figure 9:
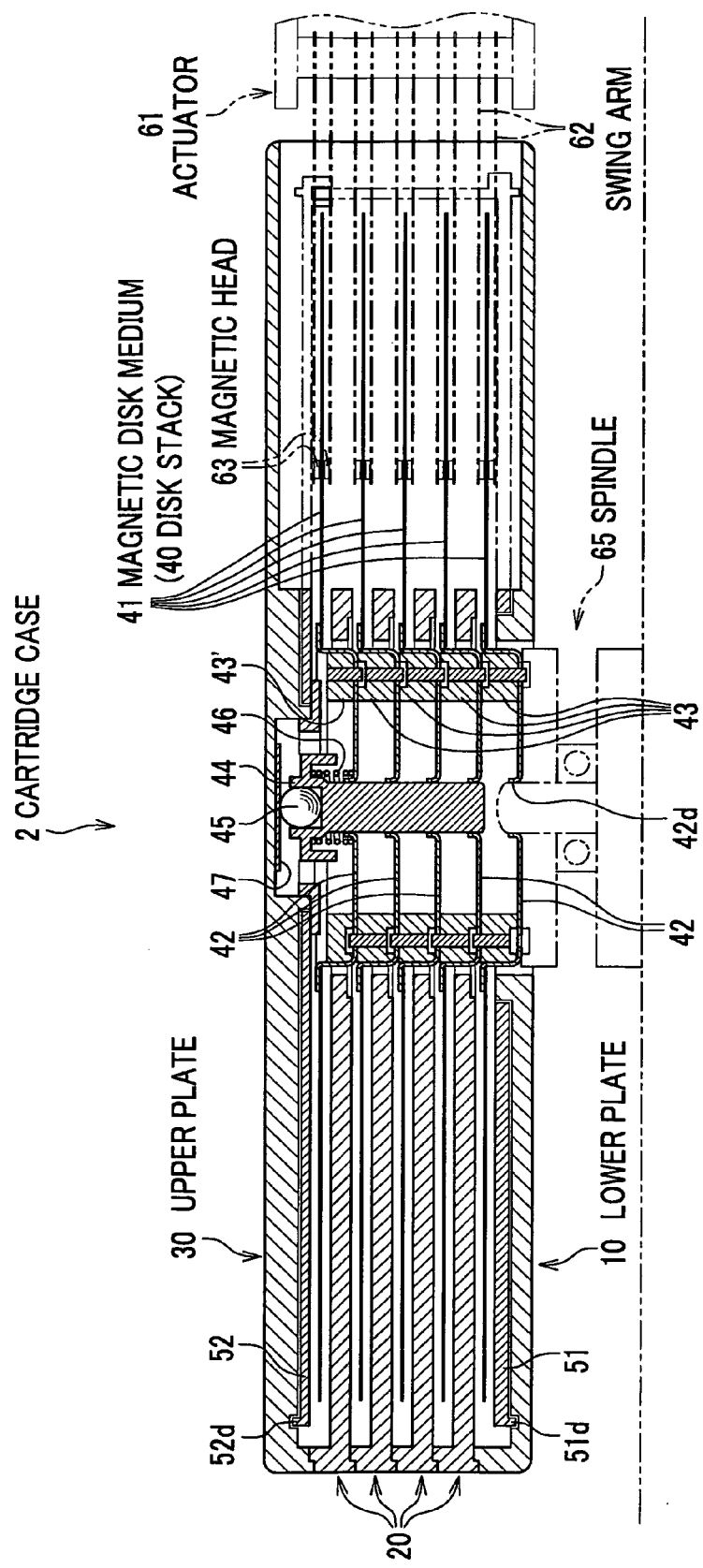
FIG. 9 is a section view taken along a line IX-IX in FIG. 2B of the magnetic disk cartridge loaded on a magnetic disk drive.

As shown in FIG. 9, such spacers 43 are provided between adjacent center cores 42, respectively. One pin 43*b* protruding toward a lower side of each of the spacers 43 enters in a small hole 42*e* of one center core 42 at the lower side of the spacer 43, and stops a rotation relative to the center core 42 at the lower side. If there is another spacer 43 at a still lower side than the center core 42 at the lower side, a floating-up of the spacer 43 for the center core 42 is prevented by the pin 43*b* entering the large diameter hole portion 43*d* in the spacer 43 at the lower side. The other pin 43*b* protruding toward an upper side of the spacer 43 enters in a small hole 42*e* of the other center core 42 at the upper side of the spacer 43, and stops a rotation relative to the center core 42 at the upper side. If there is another spacer 43 at a still upper side than the center core 42 at the upper side, the top end of the pin 43*b* enters in the large diameter hole portion 43*d* in the spacer 43 at the upper side.

Meanwhile, because at an upper side the uppermost center core 42 has no center core 42 to stop a rotation thereof, at the upper side is arranged a thin top spacer 43' in thickness where the pin 43*b* is protruded only downward.

The magnetic disk media 41 thus stacked, namely, the disk stack 40, are stably supported in rotation by a coupling shaft 44, a bearing ball 45, a compression coil spring 46, and a center plate 47.

As shown in FIG. 10, the coupling shaft 44 lessens a central fluctuation between the center cores 42 stacked, holds the bearing ball 45 and the compression coil spring 46, and comprises a shaft portion 44*a*, a ball holding portion 44*b*, and a spring holding portion 44*c*. The shaft portion 44*a* is a columnar form that can be inserted through the center holes 42*d* of the center cores 42. At an upper end of the shaft portion 44*a* the ball holding portion 44*b* is formed into a cylindrical form with a bottom opening to an upper side thereof. A depth of the ball holding portion 44*b* is larger than a radius of the bearing ball 45, and therefore, the bearing ball 45 is stably held at the ball holding portion 44*b*. The spring holding portion 44*c* consists of a form where a cylindrical form with a bottom is turned down at a side of an outer diameter of the ball holding portion 44b, and the compression coil spring 46 is arranged in a cylindrical space between the shaft portion 44a and the spring holding portion 44c. Meanwhile, although a length of the coupling shaft 44 is arbitrary, in the embodiment it is one reaching the second center core 42 from the lowermost one; the center hole 42d of the lowermost center core 42 is opened so that a spindle 65 of a magnetic disk drive can proceed.

The center plate 47 is a slide member affixed at the center of an inner face of the upper plate 30, that is, on a flat face of an inside of the rib 37. The center plate 47 can be composed of, for example, a material excellent in sliding ability and abrasion resistance such as polyoxymethylene and ultra high molecular weight polyethylene.

Although the bearing ball 45 consists of a sphere made of, for example, steel used for a ball bearing, it may also be composed of a material excellent in sliding ability and abrasion resistance, for example, such as polytetrafluoroethylene and polyoxymethylene. The bearing ball 45 is arranged within the ball holding portion 44b of the coupling shaft 44, abuts with the bottom face of the ball holding portion 44b; and a center of an inner face of the upper plate 30, that is, the center plate 47 by a point contact, and rotationally supports the disk stack 40.

In the compression coil spring 46 one end (upper end) is held by the spring holding portion 44c of the coupling shaft 44; the other end (lower end) abuts with an upper face of the uppermost center core 42, and energizes the stacked center cores 42 to the side of the lower plate 10, that is, to the side of the spindle 65 of the magnetic disk drive. Thus the center cores 42 do not jounce within the cartridge case 2, and the fluctuation of the magnetic disk media 41 is prevented in rotation thereof.

Next, how to attach the side wall member 13 and the shutter plate 51b will be described.

At first, the fitting protrusions 13d and 13e of the side wall member 13 are respectively fit (engaged) in the fitting grooves 11c and 11d, and the lower rotor 51 is mounted on the lower plate 10 so that the rib 51d of the lower rotor 51 is fit in the lower rotor support groove 18. Then, the lower end rim of the shutter plate 51b is engaged with the lower shutter groove 51g of the lower rotor 51. And, inner plates 20 to each of which a magnetic disk medium 41 is attached are stacked in order on the lower rotor 51 as described above. Next, the cylindrical portion 53a of the stop member 53 is inserted through the central opening 52c of the upper rotor 52 and then into the inside of the rib 37 of the upper plate 30, and thus the upper rotor 52 is attached and fixed to the upper plate 30. Moreover, the upper rotor 52 is mounted on the uppermost inner plate 20 in such a manner that the upper end rim of the shutter plate 51b is positioned to be engaged with the upper shutter groove 52b of the upper rotor 52, and thus the shutter plate 51b is attached and fixed to the upper rotor 52. Accordingly, the lower rotor 51 and the upper rotor 52 rotate integrally with the shutter plate 51b between them. Finally, the screws 91 are tightened into the screw holes 19 so that the side wall member 13 is fixed between the lower plate 10 and the upper plate 30 and the shutter plate 51b is fixed between the lower rotor 51 and the upper rotor 52.

As described above, in the embodiment, it is possible to change the number of the magnetic disk media 41 in the cartridge case 2 by replacing the side wall member 13 and the shutter plate 51b with another ones having heights corresponding a height varying with the number of the stacked magnetic disk media 41, and therefore construct a cartridge case 2 with a height corresponding to a height varying with the number of the magnetic disk media 41 with minimum change of its parts since the side wall member 13 is fit and attached to both of the lower plate 10 and the upper plate 30, and the shutter plate 51b is engaged with and attached to both of the lower rotor 51 and the upper rotor 52.

Figure 5:
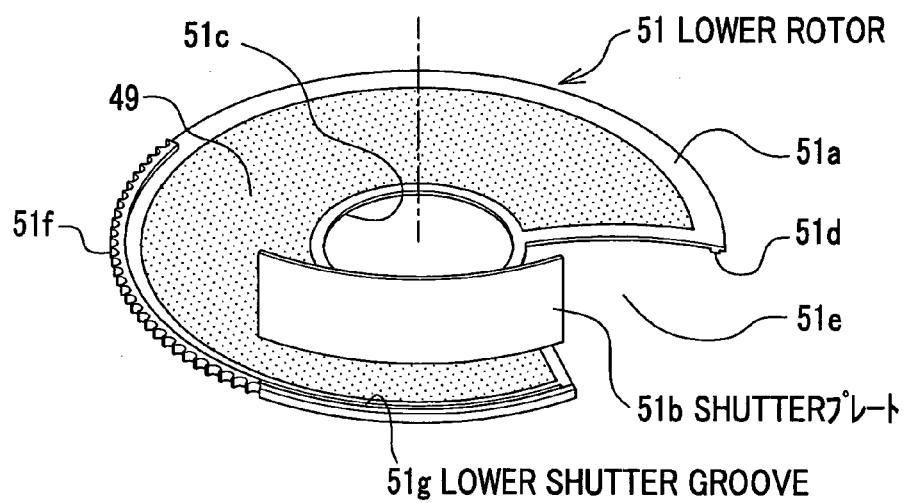
FIG. 5 is an exploded perspective view showing a lower rotor and a shutter plate.
Figure 7:
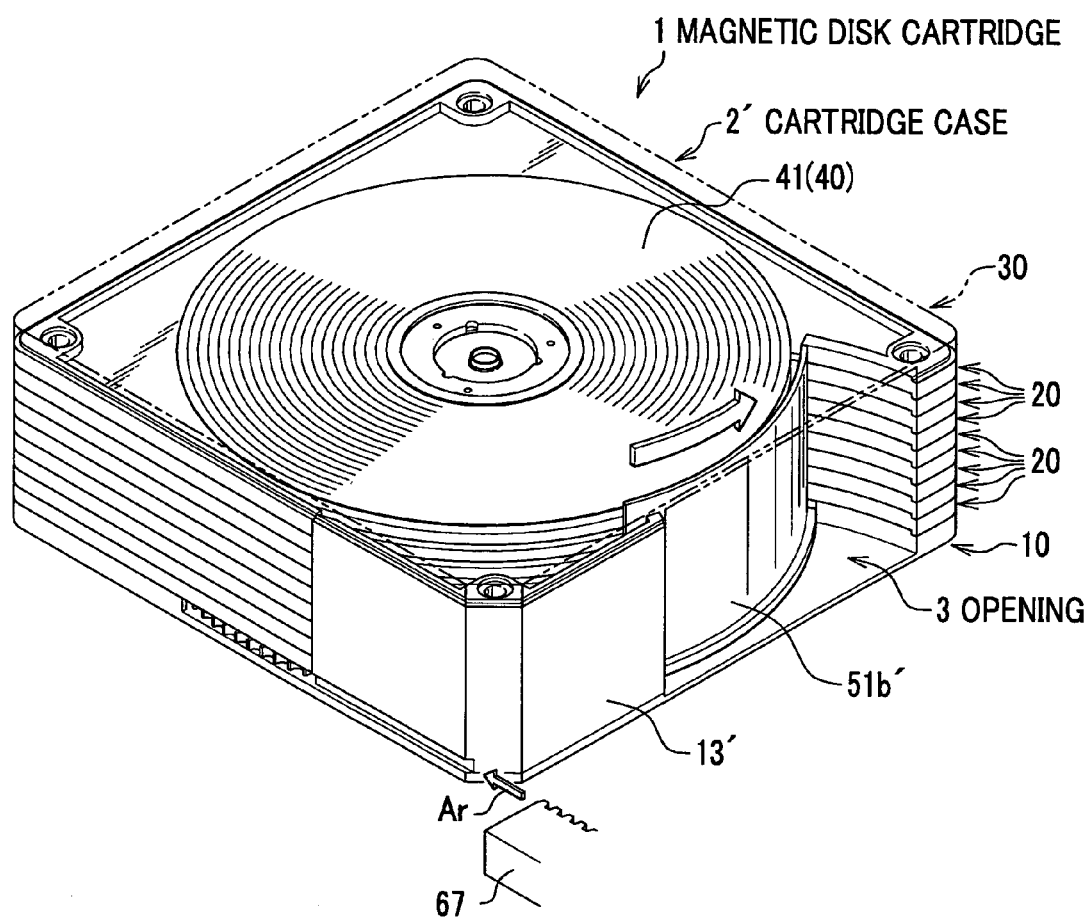
FIG. 7 is a perspective view showing nine stacked inner plates.

For example, to change the number of the magnetic disk media 41 from 5 to 9 to increase storage capacity of the magnetic disk cartridge 1, a shutter plate 51b' and a side wall member 13' having heights larger than those of the shutter plate 51b and the side wall member 13 described above, as shown in FIG. 3 and FIG. 4 are prepared. The lower end rim of the shutter plate 51b' is engaged with the lower shutter groove 51g of the lower rotor 51 (See FIG. 5), and the upper end rim of the shutter plate 51b' is engaged with the upper shutter grove 52b of the upper rotor 52 (See FIG. 1). Then, fitting protrusions 13d' and 13e' of the side wall member 13' are fit in fitting grooves 11c and 11d respectively, making it possible to form a cartridge case 2' having a height corresponding to a height varying with the number of the magnetic disk media 41 (See FIG. 7). Accordingly, it is not required to replace the whole cartridge case 2 to change the number of the magnetic disk media 41, and thus it is possible to construct the cartridge case 2' with minimum change of its parts.

A magnetic disk drive for recoding/reproducing data for the magnetic disk cartridge 1 rotates, as shown in FIG. 9, the disk stack 40 by the spindle 65. The spindle 65 attracts the lowermost center core 42 by magnetic force, enters in the center hole 42d of the center core 42, and thereby matches an axis thereof with that of the disk stack 40. At this time, because the spindle 65 slightly lifts up the center cores 42 with resisting an energizing force of the compression coil spring 46, as shown in FIGS. 9 and 10, each of the magnetic disk media 41 is positioned at center of a space formed between the lower rotor 51 and the lowermost inner plate 20, between upper and lower inner plates 20, and between the uppermost inner plate 20 and the upper rotor 52.

The magnetic heads 63 are provided at top ends of swing arms 62. Each of the magnetic heads 63 is arranged on both faces of each of the magnetic disk media 41.

Figure 2B:
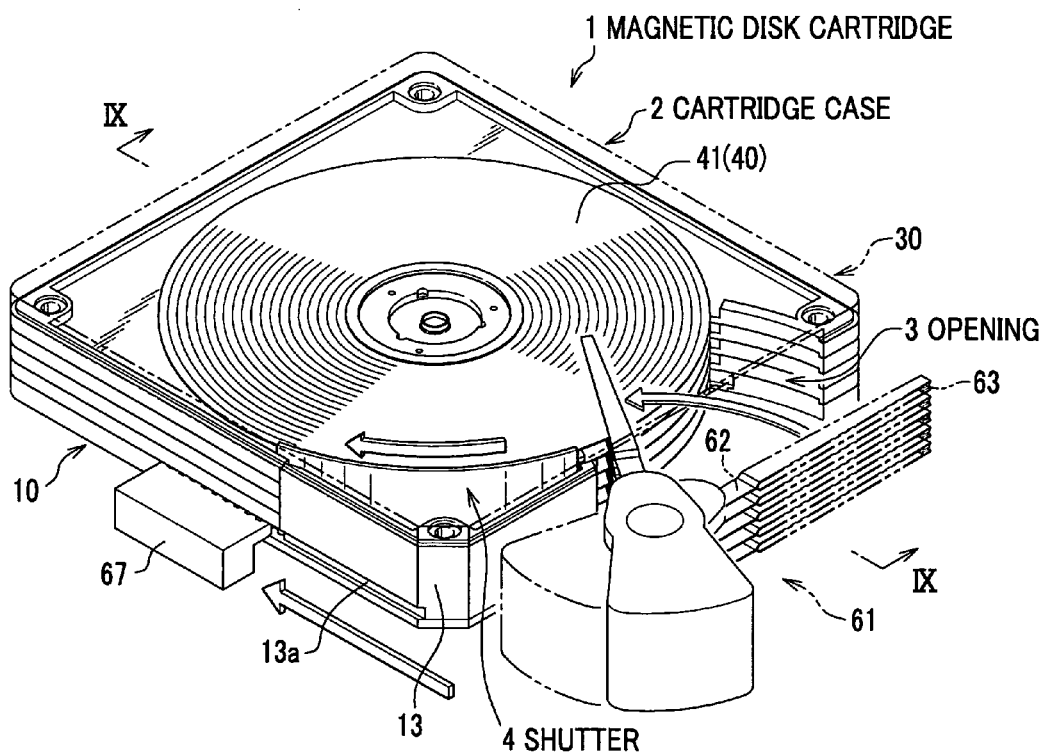
FIG. 2B is an external perspective view with the shutter opened related to the magnetic disk cartridge.

The magnetic disk cartridge 1 thus described can prevent, in no use thereof as shown in FIG. 2A, an invasion of dust thereto by closing the opening 3 with rotating the shutter 4 in a counterclockwise direction of the drawing; in use thereof as shown in FIG. 2B, when loaded on the magnetic disk drive, the shutter open gear 67 fits in the groove 13a, is guided thereby, engages in the gear 51f, and rotates the shutter 4 in a clockwise direction of the drawing.

In addition, the disk stack 40 rotates by the spindle 65 rotating. After then, the swing arms 62 rotate by being driven with an actuator 61, and each of the magnetic heads 63 are moved onto each face of the magnetic disk media 41.

When recording data on the magnetic disk media 41 with the magnetic heads 63, the data is recorded thereon by sending a signal to the magnetic heads 63 by a control circuit not shown; when reproducing data from the magnetic disk medium 41, a signal is output by detecting a change of a magnetic field on the medium 41 with the magnetic heads 63.

At this time, dust on the magnetic disk media 41 is removed by the liners 49 appropriately touching respective media 41.

After the use of the magnetic disk cartridge 1, the magnetic heads 63 are retracted from the cartridge case 2, thereafter ejects the magnetic disk cartridge 1; thereby the gear 51f is driven by the shutter open gear 67, and the shutter 4 closes the opening 3.

Thus because the magnetic disk cartridge 1 has a plurality of the magnetic disk media 41, data transfer can be performed at a higher speed by simultaneously accessing data with a plurality of magnetic heads 63.

In addition, because the cartridge case 2 is configured by stacking up the inner plates 20, it is easy to perform a specification change of making the number of magnetic disk media 41 a different one. Then, in assembling the magnetic disk cartridge 1, because the magnetic disk media 41 can be handled with being placed on the inner plates 20 and the lower rotor 51 built in the lower plate 10, an occasion of touching the magnetic disk media 41 can be reduced and a quality of the cartridge 1 can be further stabilized.

In addition, because each of the inner plates 20 is stacked on the lower plate 10 or another inner plate 20 and is fixed, the magnetic disk cartridge 1 can make it higher a parallelism to the magnetic disk media 41, can stabilize a rotation of the media 41, and enables a higher speed rotation of the media 41, furthermore a higher speed of a data transfer.

Moreover, in the embodiment, it is possible to attach the side wall member 13 and the shutter plate 51*b* so as to be engaged with the cartridge case 2. Therefore, it is possible to construct a cartridge case 2 corresponding to a height varying with the number of the magnetic disk media 41 with minimum change of its parts by preparing plural kinds of side wall members 13 and shutter plates 51*b* with various heights in advance.

Thus, although the embodiment of the present invention is described, the invention is not limited thereto and can be embodied with being changed as needed. For example, although in the embodiment the magnetic disk medium 41 is applied to a recording disk medium, an optical recording medium where data is recorded by light can also be applied thereto.

While the described embodiments represent the preferred forms of the present invention, it is to be distinctly understood that the invention is not limited thereto but may be otherwise variously embodied within the spirit and scope of the following claims.

What is claimed is:

1. A recording disk cartridge comprising:
    a plurality of flexible recording disk media which are stacked inside a cartridge case so as to rotate integrally, wherein the cartridge case comprises a lower plate for constructing a lower wall parallel to the plurality of recording disk media, a plurality of inner plates which are stacked and fixed on the lower plate and partition the plurality of recording disk media, and an upper plate which is stacked and fixed on the plurality of inner plates and constructs an upper wall of the cartridge case, an opening being formed in a part of a side wall constructed of the lower plate, the plurality of inner plates, and the upper plate;
    a lower rotor supported on an inner side of the lower plate so as to rotate;
    an upper rotor supported on an inner side of the upper plate so as to rotate; and
    a shutter plate having
    a lower end rim engaged with the lower rotor and an upper end rim engaged with the upper rotor so as to open and close the opening, and
    a height, between the lower end rim and the upper end rim of the shutter plate, corresponding to a height of the stacked recording disk media.

2. A recording disk cartridge according to claim 1, further comprising at least one side wall member having a height corresponding to a height of the stacked inner plates, a lower end and an upper end of the at least one side wall member being fit in predetermined regions of peripheral rims of the lower plate and the upper plate respectively.

3. A recording disk cartridge according to claim 1, wherein the recording disk medium is a magnetic disk medium.

4. The recording disk cartridge according to claim 1, wherein said plurality of recording disk media is three or more.

5. A recording disk cartridge comprising:
    a plurality of flexible recording disk media which are stacked inside a cartridge case so as to rotate integrally, wherein the cartridge case comprises a lower plate for constructing a lower wall parallel to the plurality of recording disk media, a plurality of inner plates which are stacked and fixed on the lower plate and which partition the plurality of recording disk media, and an upper plate which is stacked and fixed on the plurality of inner plates and constructs an upper wall of the cartridge case, an opening being formed in a part of a side wall constructed of the lower plate, the plurality of inner plates, and the upper plate;
    a lower rotor supported on an inner side of the lower plate so as to rotate:
    an upper rotor supported on an inner side of the upper plate so as to rotate; and
    a shutter plate having a height corresponding to a height of the stacked recording disk media, the shutter plate being engaged with the upper rotor an the lower rotor so as to open and close the opening,
    wherein a notch for exposing a recording face of each of the recording disk media is formed in each of the plurality of inner plates, and
    wherein the opening formed with the lower plate, the plurality of inner plates, and the upper plate stacked together in a predetermined sequence is in a position corresponding to a position where the notch is formed.

6. A recording disk cartridge according to claim 5, wherein the shutter plate is detachably attached to the upper plate and the lower plate so as to be replaced with another shutter plate with a height corresponding to a height varying with the number of stacked inner plates.

7. A recording disk cartridge according to claim 5, wherein a shutter groove is formed in each of peripheral rims of the upper rotor and the lower rotor, and wherein
    an upper end and a lower end of the shutter plate are respectively engaged with the shutter grooves in the peripheral rims of the upper rotor and the lower rotor, allowing the upper rotor and the lower rotor to rotate integrally inside the cartridge case.

8. A recording disk cartridge according to claim 7, wherein
    a support groove is provided on an inner face of the upper plate, and wherein
    the support groove is fit to a rib provided on the peripheral rim of the upper rotor and supports the upper rotor, allowing the upper rotor to rotate inside the cartridge case.

9. A recording disk cartridge according to claim 5, wherein a gear is provided on a peripheral rim of the lower rotor.

10. A recording disk cartridge according to claim 9, wherein a groove for guiding a shutter open gear which is engaged with the gear to allow the shutter plate to open and close the opening is provided on the peripheral rim of the lower plate.

11. A recording disk cartridge according to claim 5, wherein a gear is provided on a peripheral rim of the lower rotor, and wherein
a groove for guiding a shutter open gear which is engaged with the gear to allow the shutter plate to open and close the opening is provided on a peripheral rim of the lower plate.

12. A recording disk cartridge comprising:
a plurality of flexible recording disk media which are stacked inside a cartridge case so as to rotate integrally, wherein the cartridge case comprises a lower plate for constructing a lower wall parallel to the plurality of recording disk media, a plurality of inner plates which are stacked and fixed on the lower plate and partition the plurality of recording disk media, and an upper plate which is stacked and fixed on the plurality of inner plates and constructs an upper wall of the cartridge case, an opening being formed in a part of a side wall constructed of the lower plate, the plurality of inner plates, and the upper plate;
a lower rotor supported on an inner side of the lower plate so as to rotate:
an upper rotor supported on an inner side of the upper plate so as to rotate:
a shutter plate having a height corresponding to a height of the stacked recording disk media, the shutter plate being engaged with the upper rotor and the lower rotor so as to open and close the opening; and
at least one side wall member having a height corresponding to a height of the stacked inner plates, a lower end and an upper end of the at least one side wall member being fit in predetermined regions of peripheral rims of the lower plate and the upper plate respectively,
wherein a notch for exposing a recording face of each of the recording disk media is formed in each of the plurality of inner plates, and
wherein the opening formed with the lower plate, the plurality of inner plates, and the upper plate stacked together in a predetermined sequence is in a position corresponding to a position where the notch is formed.

13. A recording disk cartridge according to claim 12, wherein the side wall member is detachably attached to the upper plate and the lower plate so as to be replaced with another side wall member with a height corresponding to a height varying with the number of stacked inner plates.

14. A recording disk cartridge according to claim 13, wherein the shutter plate is detachably attached to the upper plate and the lower plate so as to be replaced with another shutter plate with a height corresponding to a height varying with the number of stacked inner plates.

15. A recording disk cartridge according to claim 12, wherein
a shutter groove is formed in each of peripheral rims of the upper rotor and the lower rotor, and wherein
an upper end and a lower end of the shutter plate are respectively engaged with the shutter grooves in the peripheral rims of the upper rotor and the lower rotor, allowing the upper rotor and the lower rotor to rotate integrally inside the cartridge case.

16. A recording disk cartridge according to claim 15, wherein
a support groove is provided on a inner face of the upper plate, and wherein
the support groove is fit to a rib provided on the peripheral rim of the upper rotor and supports the upper rotor, allowing the upper rotor to rotate inside the cartridge case.

17. A recording disk cartridge comprising:
a plurality of flexible recording disk media which are stacked inside a cartridge case so as to rotate integrally, wherein the cartridge case comprises a lower plate for constructing a lower wall parallel to the plurality of recording disk media, a plurality of inner plates which are stacked and fixed on the lower plate and which partition the plurality of recording disk media, and an upper plate which is stacked and fixed on the plurality of inner plates and constructs an upper wall of the cartridge case, an opening being formed in a part of a side wail constructed of the lower plate, the plurality of inner plates, and the upper plate:
a lower rotor supported on an inner side of the lower plate so as to rotate;
an upper rotor supported on an inner side of the upper plate so as to rotate; and
a shutter plate having a height corresponding to a height of the stacked recording disk media, the shutter plate being engaged with the upper rotor and the lower rotor so as to open and close the opening,
wherein a rib extending in a vertical direction for a stack face of the plurality of inner plates is formed at a peripheral rim of each of the plurality of inner plates, a lower plate rib for abutting with the rib of a lowermost inner plate is provided on the lower plate, and an upper plate rib for abutting with a rib of an uppermost inner plate is provided on the upper plate.

18. A recording disk cartridge according to claim 17, wherein a part of a side wall of the recording disk cartridge formed with the lower plate, the plurality of inner plates, and the upper plate stacked together in a predetermined sequence is constructed of the ribs, the lower plate rib, and the upper plate rib.

19. A recording disk cartridge comprising:
a plurality of flexible recording disk media which are stacked inside a cartridge case so as to rotate integrally, wherein the cartridge case comprises a lower plate for constructing a lower wall parallel to the plurality of recording disk media, a plurality of inner plates which are stacked and fixed on the lower plate and which partition the plurality of recording disk media, and an upper plate which is stacked and fixed on the plurality of inner plates and constructs an upper wall of the cartridge case, an opening being formed in a part of a side wall constructed of the lower plate, the plurality of inner plates, and the upper plate:
a lower rotor supported on an inner side of the lower plate so as to rotate:
an upper rotor supported on an inner side of the upper plate so as to rotate; and
a shutter plate having a height corresponding to a height of the stacked recording disk media, the shutter plate being engaged with the upper rotor and the lower rotor so as to open and close the opening,
wherein the recording disk media are stacked by engaging center cores of the recording disk media with spacers each disposed between adjacent center cores, and
wherein each of the spacers stops a relative rotation between the adjacent center cores so as to allow the stacked recording disk media to integrally rotate.

20. A recording disk cartridge comprising:
a plurality of flexible recording disk media which are stacked inside a cartridge case so as to rotate integrally, wherein the cartridge case comprises a lower plate for constructing a lower wall parallel to the plurality of recording disk media, a plurality of inner plates which are stacked and fixed on the lower plate and which partition the plurality of recording disk media, and an upper plate which is stacked and fixed on the plurality of inner plates and constructs an upper wall of the cartridge case, an opening being formed in a part of a side wall constructed of the lower plate, the plurality of inner plates, and the upper plate;

a lower rotor supported on an inner side of the lower plate so as to rotate:

an upper rotor supported on an inner side of the upper plate so as to rotate; and a shutter plate having a height corresponding to a height of the stacked recording disk media, the shutter plate being engaged with the upper rotor and the lower rotor so as to open and close the opening, wherein a liner is provided on each of an upper face of the lower rotor, upper faces and lower faces of the plurality of inner plates, and a lower face of the upper rotor.

21. A recording disk cartridge comprising:

a plurality of flexible recording disk media which are stacked inside a cartridge case so as to rotate integrally, wherein the cartridge case comprises a lower plate for constructing a lower wall parallel to the plurality of recording disk media, a plurality of inner plates which are stacked and fixed on the lower plate and which partition the plurality of recording disk media, and an upper plate which is stacked and fixed on the plurality of inner plates and constructs an upper wall of the cartridge case, an opening being formed in a part of a side wall constructed of the lower plate, the plurality of inner plates, and the upper plate;

a lower rotor supported on an inner side of the lower plate so as to rotate:

an upper rotor supported on an inner side of the upper plate so as to rotate; and a shutter plate having a height corresponding to a height of the stacked recording disk media, the shutter plate being engaged with the upper rotor and the lower rotor so as to open and close the opening, wherein the recording disk medium is an optical disk medium.

\* \* \* \* \*